United States Patent
Xu et al.

(10) Patent No.: US 7,393,375 B2
(45) Date of Patent: *Jul. 1, 2008

(54) FILTER ELEMENT HAVING SEALING MEMBERS AND METHODS

(75) Inventors: Jian Xu, Maple Grove, MN (US); John David Kuhn, Richfield, MN (US); Edward J. Kreitinger, Apple Valley, MN (US); Wayne R. W. Bishop, St. Louis Park, MN (US); Steven Scott Gieseke, Richfield, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/275,865

(22) Filed: Feb. 1, 2006

(65) Prior Publication Data
US 2006/0089289 A1    Apr. 27, 2006

Related U.S. Application Data

(63) Continuation of application No. 10/925,790, filed on Aug. 24, 2004, now Pat. No. 6,997,968, which is a continuation of application No. 10/646,627, filed on Aug. 22, 2003, now Pat. No. 6,878,190, which is a continuation of application No. 09/875,844, filed on Jun. 6, 2001, now Pat. No. 6,610,126.

(51) Int. Cl.
*B01D 46/00* (2006.01)
*B01D 29/07* (2006.01)

(52) U.S. Cl. .............. 55/495; 55/498; 55/500; 55/502; 55/503; 55/521

(58) Field of Classification Search ........... 55/495, 55/498, 500, 502, 503, 521, 357; 95/273
See application file for complete search history.

(56) References Cited

U.S. PATENT DOCUMENTS 1,238,068 A    8/1917    Slater et al.

(Continued)

FOREIGN PATENT DOCUMENTS

EP    1 364 695 A1    11/2003

(Continued)

OTHER PUBLICATIONS

Complaint with Exhibits A-F; *Donaldson Company, Inc. v. Mann+Hummel USA, Inc. and Mann+Hummel GmbH*, United States District Court District of Minnesota, Case 0:07-cv-04136 MJD-SRN filed Oct. 1, 2007.

(Continued)

*Primary Examiner*—Jason M. Greene
(74) *Attorney, Agent, or Firm*—Merchant & Gould, P.A.

(57) ABSTRACT

A filter arrangement includes a media construction comprising a corrugated sheet secured to a flat sheet rolled into a coiled construction. A frame and a first seal member are provided. The frame secures the first seal member to the coiled construction. The first seal member is preferably oriented to form a radial seal with a housing. A second seal member is secured to the outer annular surface of the coiled construction. The second seal member includes a gasket extension having first and second opposite ends; an attachment portion; and a protrusion extending from the attachment portion. The second seal member is preferably oriented to form an axial seal with a housing. Air cleaners preferably utilizing filter arrangements as described herein operably installed within housings. Methods of installing, filtering, assembling, and servicing preferably include arrangements as described herein.

15 Claims, 5 Drawing Sheets

U.S. PATENT DOCUMENTS

| | | | |
|---|---|---|---|
| 2,502,545 A | 4/1950 | Wellborn | |
| 2,599,604 A | 6/1952 | Bauer et al. | |
| 2,890,796 A | 1/1959 | Blood | |
| 2,887,177 A | 5/1959 | Mund et al. | |
| 3,025,963 A | 3/1962 | Bauer | |
| 3,076,554 A | 2/1963 | Bub | |
| 3,209,917 A | 10/1965 | Yelinek | |
| 4,065,341 A | 12/1977 | Cub | |
| 4,158,449 A | 6/1979 | Sun et al. | |
| 4,159,899 A | 7/1979 | Deschenes | |
| 4,162,906 A | 7/1979 | Sullivan et al. | |
| 4,430,223 A | 2/1984 | Miyakawa et al. | |
| 4,537,608 A | 8/1985 | Koslow | |
| 4,767,531 A | 8/1988 | Holzer | |
| 4,925,469 A | 5/1990 | Clement et al. | |
| 4,925,561 A | 5/1990 | Ishii et al. | |
| 4,963,170 A | 10/1990 | Weber et al. | |
| 4,997,466 A | 3/1991 | Hood | |
| 5,030,264 A | 7/1991 | Klotz et al. | |
| 5,125,941 A | 6/1992 | Ernst et al. | |
| 5,137,696 A | 8/1992 | Hitachi et al. | |
| 5,211,846 A | 5/1993 | Kott et al. | |
| 5,213,596 A | 5/1993 | Kume et al. | |
| 5,229,078 A | 7/1993 | Haerle | |
| 5,304,312 A | 4/1994 | Forster et al. | |
| 5,346,675 A | 9/1994 | Usui et al. | |
| 5,374,402 A | 12/1994 | Hitachi et al. | |
| 5,415,677 A * | 5/1995 | Ager et al. | 55/502 |
| 5,435,870 A | 7/1995 | Takagaki et al. | |
| 5,472,463 A | 12/1995 | Herman et al. | |
| 5,484,466 A | 1/1996 | Brown et al. | |
| 5,487,767 A | 1/1996 | Brown | |
| 5,494,497 A | 2/1996 | Lee | |
| 5,543,007 A | 8/1996 | Takagaki et al. | |
| 5,547,480 A | 8/1996 | Coulonvaux | |
| 5,679,074 A | 10/1997 | Siegel | |
| 5,714,126 A | 2/1998 | Frund | |
| 5,730,768 A | 3/1998 | Kaminaga et al. | |
| 5,740,774 A | 4/1998 | Kennedy | |
| 5,772,883 A | 6/1998 | Rothman et al. | |
| D396,098 S | 7/1998 | Gillingham et al. | |
| 5,792,247 A | 8/1998 | Gillingham et al. | |
| 5,820,646 A | 10/1998 | Gillingham et al. | |
| 5,895,574 A | 4/1999 | Friedmann et al. | |
| 5,897,676 A | 4/1999 | Engel et al. | |
| 5,902,364 A | 5/1999 | Tokar et al. | |
| D417,268 S | 11/1999 | Gillingham | |
| 6,004,366 A | 12/1999 | Engel et al. | |
| 6,179,890 B1 | 1/2001 | Ramos et al. | |
| 6,190,432 B1 | 2/2001 | Gieseke et al. | |
| 6,210,469 B1 | 4/2001 | Tokar | |
| 6,221,122 B1 | 4/2001 | Gieseke et al. | |
| 6,231,630 B1 | 5/2001 | Ernst et al. | |
| 6,235,195 B1 | 5/2001 | Tokar | |
| 6,299,661 B1 | 10/2001 | Bloomer | |
| 6,348,084 B1 | 2/2002 | Gieseke et al. | |
| 6,350,291 B1 | 2/2002 | Gieseke et al. | |
| 6,368,374 B1 | 4/2002 | Tokar et al. | |
| 6,585,792 B2 | 7/2003 | Schneider et al. | |
| 6,598,580 B2 | 7/2003 | Baumann et al. | |
| 6,610,126 B2 * | 8/2003 | Xu et al. | 95/273 |
| 6,878,190 B1 * | 4/2005 | Xu et al. | 95/273 |
| 6,997,968 B2 * | 2/2006 | Xu et al. | 55/495 |
| 7,004,986 B2 | 2/2006 | Kopec et al. | |
| 2002/0185007 A1 | 12/2002 | Xu et al. | |

FOREIGN PATENT DOCUMENTS

| | | |
|---|---|---|
| FR | 2 034 160 | 12/1970 |
| GB | 703823 | 2/1954 |
| JP | 60-112320 | 7/1985 |
| JP | 1171615 | 7/1989 |
| WO | WO97/40908 | 11/1997 |
| WO | WO97/40910 | 11/1997 |
| WO | WO97/40917 | 11/1997 |
| WO | WO97/41939 | 11/1997 |
| WO | WO 00/50149 | 8/2000 |

OTHER PUBLICATIONS

Notice Of Claims Involving Patents; *Donaldson Company, Inc. v. Mann+Hummel USA, Inc. and Mann+Hummel GmbH*, United States District Court District of Minnesota, Case 0:07-cv-04136 MJD-SRN filed Oct. 1, 2007.

Rule 7.1 Disclosure Statement of Plaintiff Donaldson Company, Inc.; *Donaldson Company, Inc. v. Mann+Hummel USA, Inc. and Mann+Hummel GmbH*, United States District Court District of Minnesota, Case 0:07-cv-04136 MJD-SRN filed Oct. 1, 2007.

Civil Cover Sheet; *Donaldson Company, Inc. v. Mann+Hummel USA, Inc. and Mann+Hummel GmbH*, United States District Court District of Minnesota, Case 0:07-cv-04136 MJD-SRN filed Oct. 1, 2007.

* cited by examiner

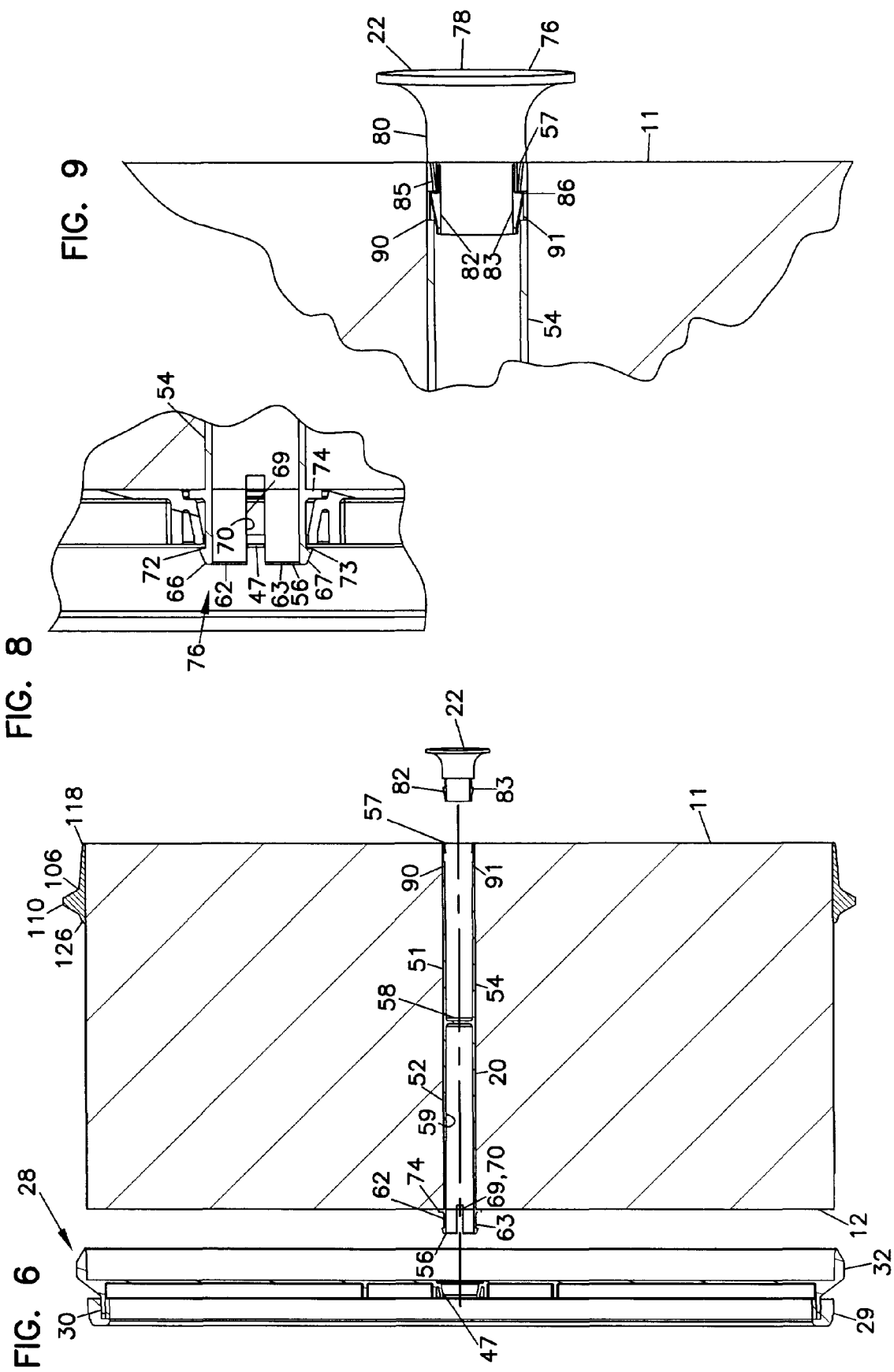

FILTER ELEMENT HAVING SEALING MEMBERS AND METHODS

This application is a continuation of application Ser. No. 10/925,790, filed Aug. 24, 2004, now U.S. Pat. No. 6,997,968 which is a continuation of application Ser. No. 10/646,627, filed Aug. 22, 2003, issued as U.S. Pat. No. 6,878,190, which is a continuation of application Ser. No. 09/875,844, filed Jun. 6, 2001, issued as U.S. Pat. No. 6,610,126, all of which are incorporated herein by reference.

TECHNICAL FIELD

This disclosure describes filter constructions for filtering fluids, such as gas or liquid. In particular, this disclosure describes a straight-through flow filter element with sealing members, and methods for using and assembling such a filter element.

BACKGROUND OF THE INVENTION

Straight through flow filter elements have been used in systems for cleaning fluid passing therethrough. Straight through flow filter elements typically have an inlet face and an oppositely disposed outlet face. In this manner, fluid flows in one direction upon entering the filter element at the inlet face and will have the same direction of flow as it exits the outlet face. Typically, straight through flow filter elements will be installed in a duct or housing of some type. After a period of use, the filter element will require servicing, either cleaning or a complete replacement of the filter element. If it is difficult or inconvenient to service the filter element, the user may delay the proper servicing, which can cause damage to whatever system is being filtered.

Improvements to straight through flow filter elements are desirable.

SUMMARY

A filter arrangement is provided and includes a media construction comprising a corrugated sheet secured to a flat sheet rolled into a coiled construction. A frame and a first seal member are provided. The frame secures the first seal member to the coiled construction. The first seal member is preferably oriented to form a radial seal with a housing. A second seal member is secured to the outer annular surface of the coiled construction. The second seal member includes a gasket extension having first and second opposite ends; an attachment portion; and a protrusion extending from the attachment portion. The second seal member is preferably oriented to form an axial seal with a housing.

Air cleaners preferably utilize filter arrangements as described herein operably installed within housings.

Methods of installing, filtering, assembling, and servicing preferably include arrangements as described herein.

BRIEF DESCRIPTION OF THE DRAWINGS

FIG. 6 is a schematic, exploded, cross-sectional view of the filter element utilized in the air cleaner of FIG. 1;

FIG. 8 is a schematic, enlarged, fragmented, cross-sectional view showing a connection between the frame of FIG. 7 and a core of the filter element depicted in FIG. 6;

FIG. 9 is a schematic, enlarged, fragmented, cross-sectional view depicting connection between a knob and a core of the filter element depicted in FIG. 6.

DETAILED DESCRIPTION

Figure 1:
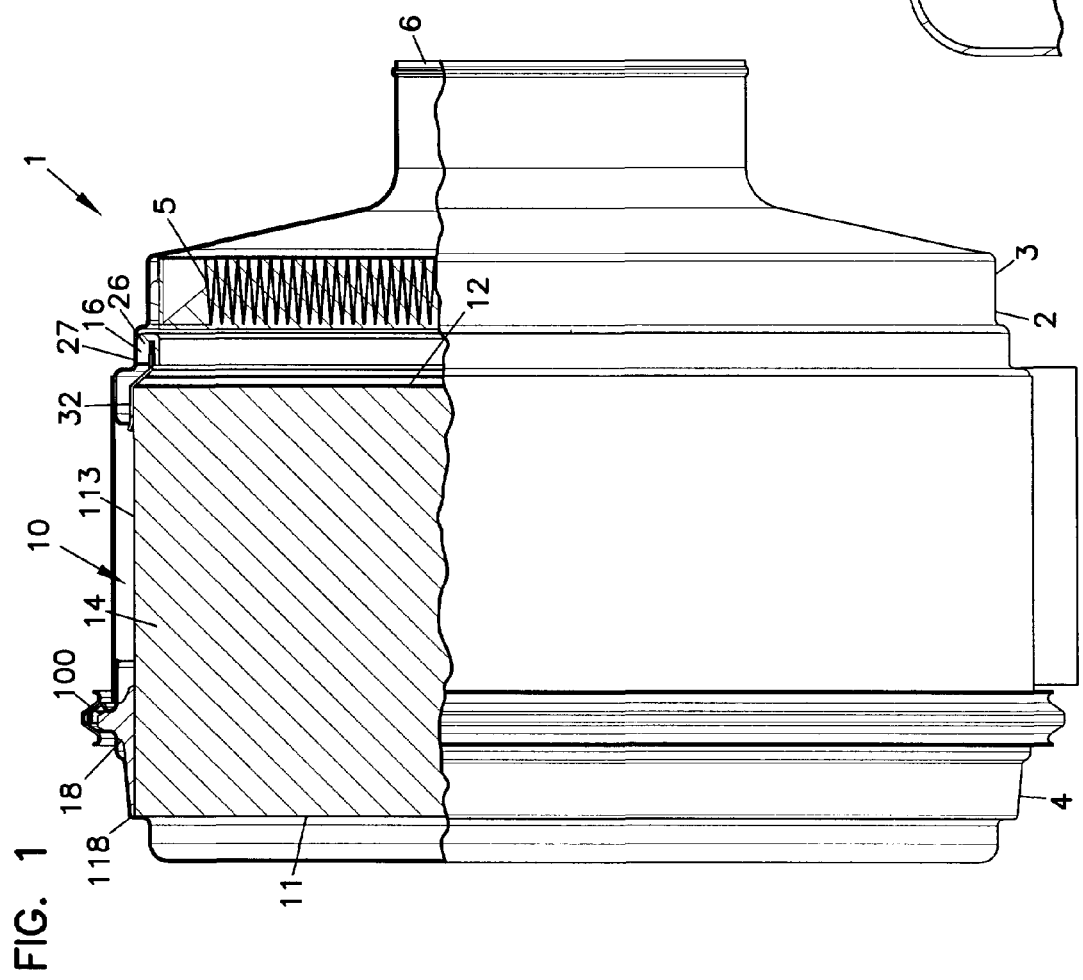
FIG. 1 is a schematic, side elevational view with a portion broken away showing a cross-section of one embodiment of an air cleaner including a housing with a filter element, the cross-section being taken along the line 1-1 of FIG. 2, constructed according to principles of this disclosure.

FIG. 1 depicts an air cleaner 1, including a housing 2 with a filter element 10 operably mounted therein. The housing 2 preferably includes a body member 3 and a removable cover 4. The filter element 10 is selectively removable and replaceable from the housing 2 by removing the cover 4 from the body member 3, providing access to the element 10.

The air cleaner 1 is usable for cleaning fluid, such as gas, in particular air. The filter element 10 is configured to permit straight through flow. By the term "straight through flow," it is meant that the fluid flows directly through the filter element 10, entering at an inlet face 11 and exiting in a same direction at an opposite, outlet face 12 without turning a corner. The filter element 10 includes filter media 14 that is configured to filter particulates from the gas stream entering at the inlet face 11, such that the gas stream exiting the outlet face 12 is at least partially clean (i.e., free of particulates). As can also be seen in FIG. 1, the filter element 10 includes a first seal member 16, which aids in inhibiting leakage between the filter element 10 and the housing 2 in which the filter element 10 is installed. The filter element also includes a second seal member 18, which is oriented upstream of the first seal member 16, and also aids in inhibiting leakage between the element 10 and the housing 2. The second seal member 18 also helps to prevent an accumulation of dust between the element 10 and the housing 2 upstream of the first seal member 16. The filter element 10 may include an optional center piece construction 20, depicted in FIG. 6.

The air cleaner 1 may also include an optional safety element 5. In FIG. 1, the safety element 5 is depicted schematically, and is oriented downstream of the filter element 10. The safety element 5 helps to protect downstream components in the filtration system, in case of failure of the filter element 10. The safety element 5 also protects downstream components during servicing of the air cleaner 1. By "servicing", it is meant when the cover 4 is removed from the body member 3, and the filter element 10 is removed from the body member 3 and replaced with a new filter element. The air cleaner 1 may also include an optional secondary element (not shown in the drawings). The secondary element would also provide protection to downstream components while servicing the air cleaner 1. One usable secondary element includes the secondary elements described in U.S. Pat. No. 6,221,122 issued on Apr. 24, 2001, which patent is incorporated herein by reference.

Figure 2:
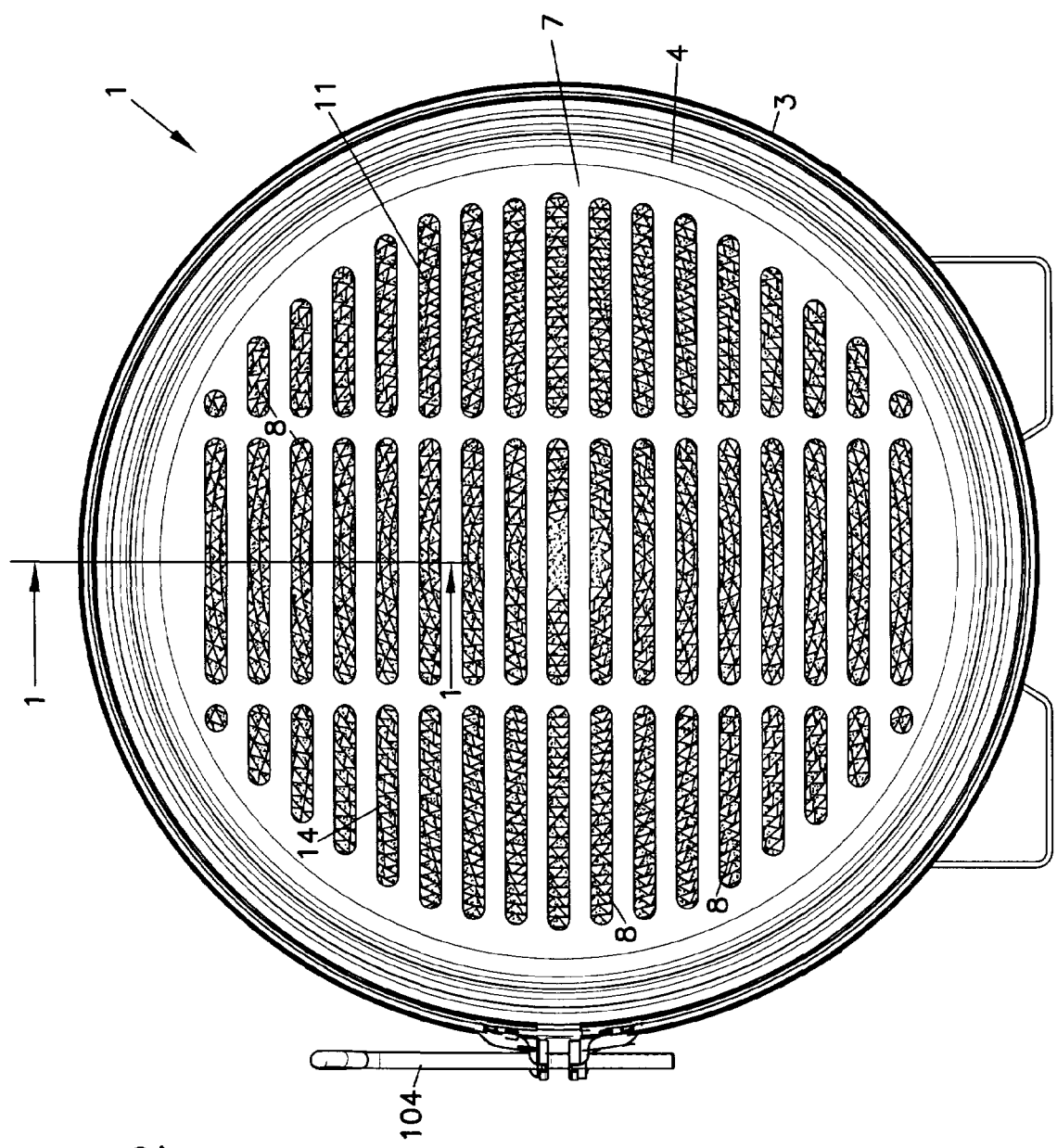
FIG. 2 is a schematic end view of the air cleaner depicted in FIG. 1.

Other features visible in FIGS. 1 and 2 include an outlet tube 6 on the body member 3 and an inlet grid 7 on the cover 4. In particular, the cover 4 defines a plurality of elongated slots 8 to take in incoming gas to be directed through the filter element 10. The grid 7 helps to remove large particles, such as leaves and insects from the gas stream being directed into the filter element 10.

Figure 10:
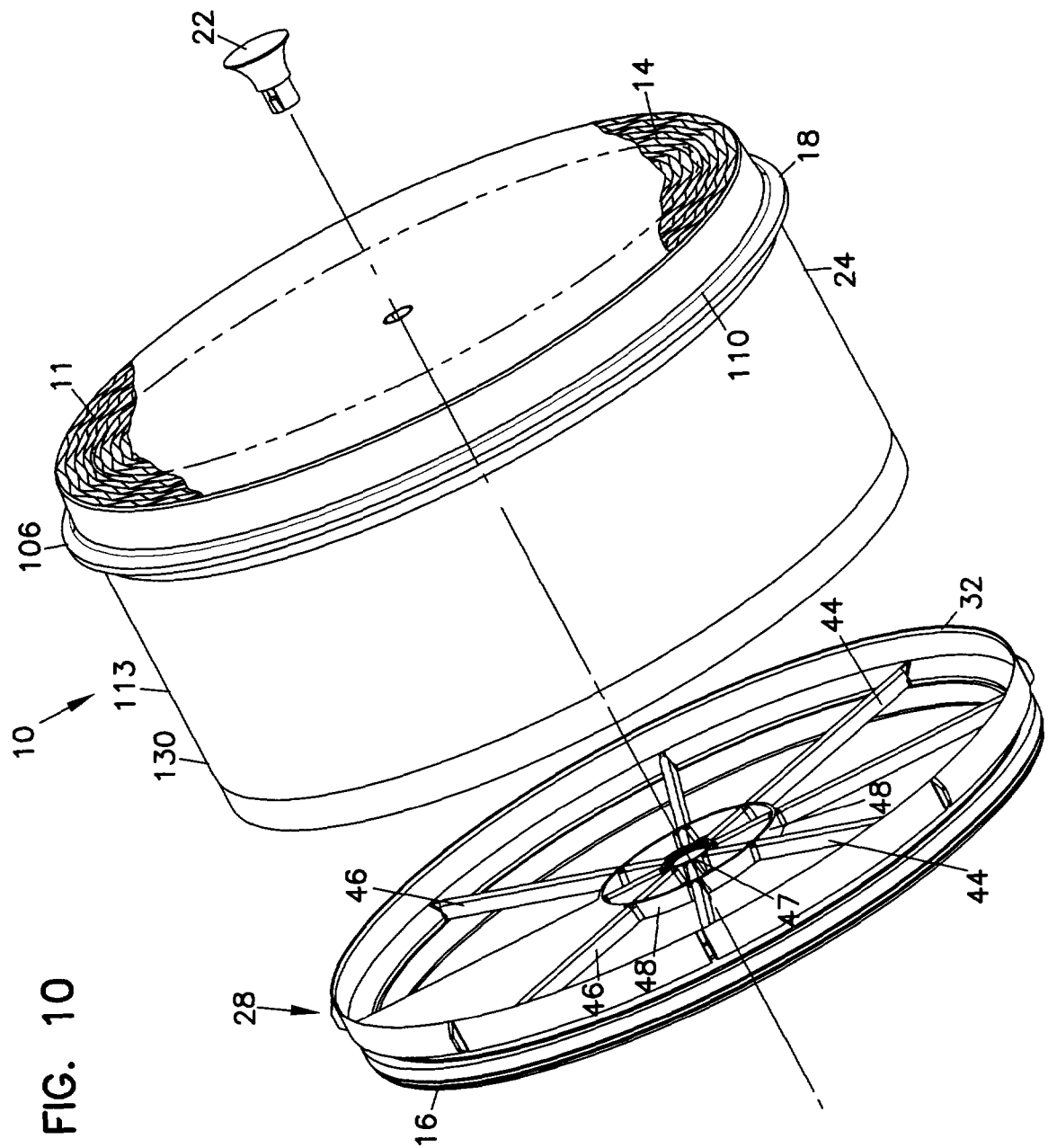
FIG. 10 is a schematic, exploded, perspective view of the filter element utilized in the air cleaner of FIG. 1.

Filter media 14 usable in this construction is described in detail in U.S. Pat. No. 6,190,432 and international publication WO 97/40918, published Nov. 6, 1997. Each of these publications is incorporated by reference herein. In general, the filter media 14 is a coiled construction 24 (FIG. 10) having a fluted sheet secured to a flat sheet. The fluted sheet generally is a corrugated layer and is secured to the flat sheet with an adhesive, which helps to form appropriate seals. The corrugation utilized in the filter media 14 can be many types of configurations. Of those possible, examples include corrugations resulting in straight flutes, where the flutes are parallel to each other; straight flutes having crushed ends or pinched ends; and tapered flutes, where alternating flutes gradually converge from a wide section to a narrow section with the next adjacent flute diverging from a narrow section to a wide section. In the element 10 depicted, the corrugated sheet and flat sheet secured together are rolled or coiled around a portion of the center piece construction 20 (FIG. 6), with an adhesive to inhibit air leakage between the media 14 and the center piece construction 20. In other embodiments, the element 10 may be coreless, such that the fluted sheet and flat sheet secured together are not rolled around a center core.

The flute chambers form alternating peaks and troughs. The troughs and peaks divide the flutes into a first row and a second row. The flute chambers are then closed (for example, by a bead of sealant) to fills a portion of the upstream end of the flute between the fluting sheet and the flat sheet. On the opposite end, another end bead (for example) closes the downstream end of alternating flutes. This results in filter media 14 having media comprising a plurality of flute chambers, with each of the flute chambers having a first end adjacent to the filter element inlet face 11, and a second end adjacent to the filter element outlet face 12. Selected ones of the flute chambers are open at the first end and closed at the second end ("inlet flutes"), while selected ones of the flute chambers are closed at the first end and open at the second end ("outlet flutes").

When using filter media 14 constructed in this manner, during use, unfiltered fluid, such as air, enters the inlet flutes at the inlet face 11 through the open upstream end. The unfiltered fluid is not permitted to pass through the downstream ends of those flute chambers that they entered into because those particular flute chambers are closed by a sealant bead. Thus, the fluid is forced to proceed through the fluting sheet or the flat sheet. As the unfiltered fluid passes through the fluting sheet or the flat sheet, the fluid is cleaned or filtered. The fluid then passes through the outlet flutes that have their upstream ends closed and their downstream ends open.

Figure 7:
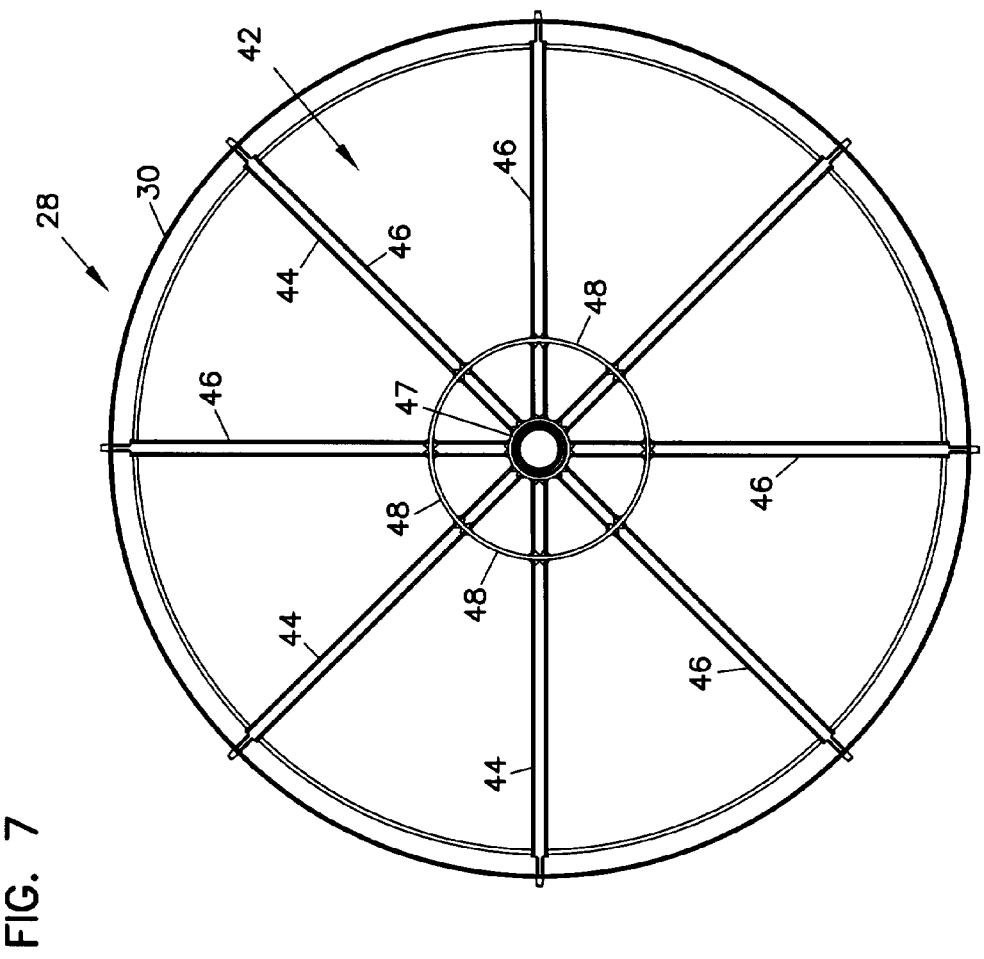
FIG. 7 is an end view of one embodiment of a frame utilized by the filter element of FIG. 6.

In reference again to FIG. 1, it can be seen how the filter element 10 is sealed within the housing 2. The seal member 16 is for creating a seal with the housing that the filter element 10 is installed within. Such a seal will inhibit leakage of fluid between the filter element 10 and the housing, to ensure that the unfiltered fluid must pass through the filter media 14 for cleaning. The seal member 16 can include various types of sealing arrangements, such as axially directed seals, radially directed seals, or a combination of these. In the particular one depicted in FIG. 1, the seal member 16 is a radial seal member 26, configured to result in a radially directed seal 27 with the housing. In this particular embodiment, the radial seal member 26 is supported by a frame construction 28 (FIGS. 6 and 7). The frame construction 28 includes an extension 30 (FIG. 6) that projects or extends axially from the outlet face 12. The frame construction 28 also includes a skirt or band 32 that is used to secure the filter media 14 to remaining portions of the frame construction 28.

Figure 4:
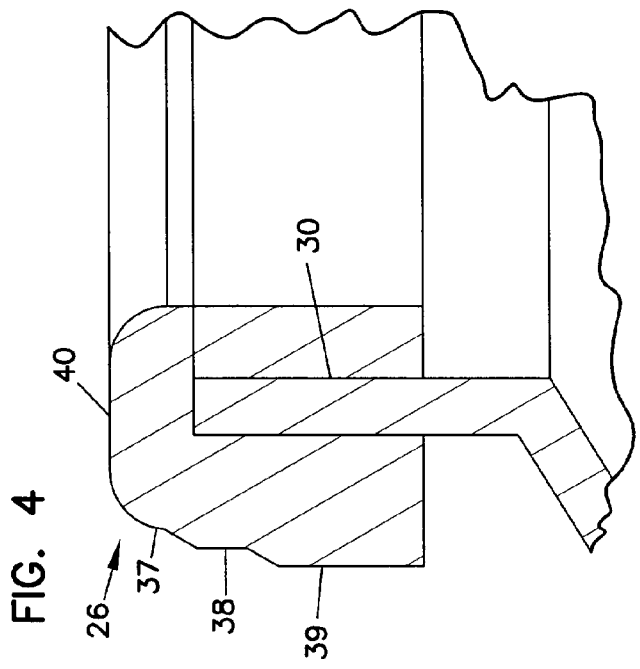
FIG. 4 is an enlarged, schematic, cross-sectional view of one of the seal members of the filter element depicted in FIG. 1.

The particular radial seal member 26 that is preferred is shown, enlarged, in FIG. 4. The preferred seal member 26 depicted has a stepped cross-sectional configuration of increasing outermost dimensions and defines a plurality of progressively larger steps, in this case, three steps 37, 38, 39 from an end tip 40 and in the direction toward the rest of the filter element 10. The smallest step 37 allows for easy insertion of the filter element 10 into the housing. The largest step 39 ensures that a tight radial seal is formed. In preferred cases, the radial seal member 26 is made from a polyurethane foam material having "as-molded" density of no greater than 25 lbs per cubic foot, typically about 11-22 lbs. per cubic foot. This material permits the seal member 26 to be soft and compressible, such that the seal member 26 can be compressed between the extension 30 and a sealing surface of the housing in which it is installed. In preferred applications, the seal member 26 is compressed between about 15% and 40% of its thickness. The radial seal member 26 and the manner in which it is used to seal against a housing is described in detail in U.S. Pat. No. 6,190,432, which is incorporated herein by reference.

Preferably, the radial seal member 26 will be supported by the frame construction 28 to help keep the seal member 26 properly oriented against the sealing surface of the housing. The frame construction 28 preferably includes a truss system 42 (FIG. 7) to help support the seal member 26. In general, the truss system 42 includes a plurality of struts or support members 44 arranged and configured to provide structural support and take the forces exerted by the compression of the seal member 26 against the extension 30. The struts or support members 44 can be arranged in a variety of configurations. In the particular arrangement shown in FIG. 7, the truss system 42 includes a plurality of spokes 46 symmetrically arranged over the outlet face 12, radially extending from a hub 47 centered over the center piece construction 20 and terminating at the extension 30 and the band 32. The truss system 42 further includes arched members 48 extending between and connecting each of the spokes 46.

Figure 3:
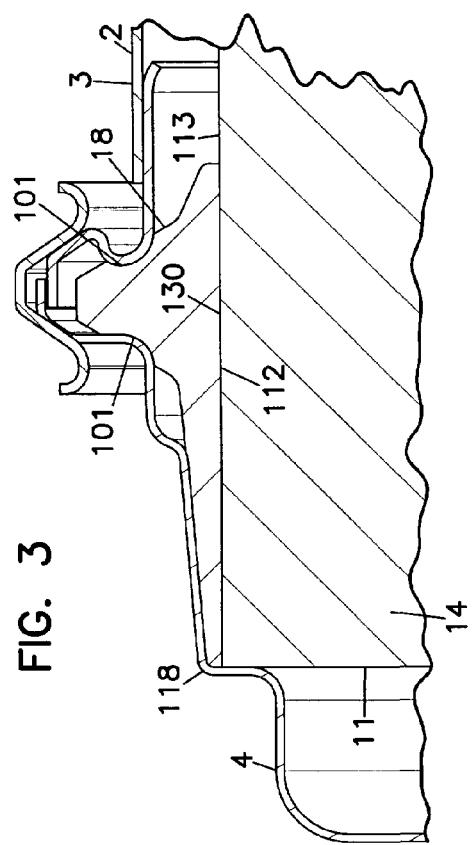
FIG. 3 is an enlarged, schematic, fragmented, cross-sectional view of a portion of FIG. 1 showing one of the seals.

Turning now to the second seal member 18, it can be seen in FIG. 1 how the second seal member 18 is arranged relative to the filter element 10 and the housing 2 to provide a seal 100 therebetween. An enlarged, schematic view of this seal is shown in FIG. 3. The second seal member 18 may be oriented and sized in a variety of configurations to result in an axial seal, a radial seal, or a combination of these types. In the arrangement depicted in FIG. 3, the seal member 18, the housing 2, and the filter element 10 are constructed, sized, and arranged to result in an axial seal 101. In particular, the seal member 18 is squeezed or compressed by axial forces between the cover 4 and the body member 3 by action of the clamp assembly 104 (FIG. 2). Tightening of the clamp assembly 104 results in the cover 4 being moved axially against the body member 3. This squeezes the seal member 18 between the cover 4 and the body member 3 to result in the axial seal 101.

Figure 5:
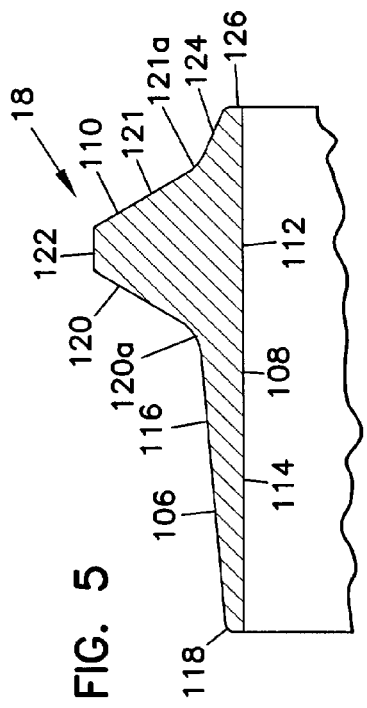
FIG. 5 is a schematic, enlarged, fragmented cross-sectional view of one of the seal members of the filter element depicted in FIG. 1.

FIG. 5 depicts an enlarged, fragmented, schematic, cross-sectional view of the seal member 18. The particular seal member 18 depicted includes a gasket extension 106 having an attachment portion 108 and a protrusion 110 for forming the axial seal 101, extending from the attachment portion 108. In particular, the attachment portion 108 includes an attachment surface 112, being generally a smooth, flat plane 114 that provides for secure attachment to an outer annular surface 113 of the coiled construction 24. Opposite of the attachment surface 112 is a bevel or ramp 116 extending from one end 118 (adjacent to the inlet end 11 of the element 10) up until the protrusion 110. The protrusion 110 includes first and second inclines 120, 121 with a land 122 extending therebetween. In the preferred embodiment shown, the land 122 is generally parallel to the attachment surface 112. Also, in preferred embodiments, the inclines 120, 121 are symmetrical. It can be seen in FIG. 5 that the protrusion 110 (the protrusion 110 including: the inclines 120, 121; the land 122; and an imaginary straight line connecting portions 120*a*, 121*a* where the inclines intersect the attachment portion 108) generally resemble a truncated triangle. In preferred embodiments, the protrusion 110 has the cross-sectional shape of a trapezoid. Extending from the protrusion 110, adjacent to the incline 121 is a second ramp 124. The ramp 124 extends from the incline 121 to an end 126. End 118 and end 126 form opposite ends of the gasket extension 106. The end 126 is nearer to the outlet end 12 of the element 10 than the end 118 is to the outlet end 12.

In preferred embodiments, the end 118 of the gasket extension 106 is even with the inlet face 11. This arrangement helps to protect the element 10 during installation of the element 10 in the housing 2. In addition, the cover 4 is more tightly secured to the body member 3 by the extension of the ramp 116.

One, specific, usable gasket extension 106 includes the following dimensions: an overall length between end 118 and end 126 of at least 2 inches, preferably 2.5-3.4 inches; a height of the protrusion 110 from the attachment surface 112 to the land 122 of at least 0.5 inch, preferably 0.75-1 inch; the land 122 extending from the end 118 at least 1.5 inches, preferably 1.75-2.25 inches; a length of the land 122 extending at least 0.1 inch, preferably 0.2-0.3 inch; each of the inclines 120, 121 being angled relative to the plane parallel to the land 122 at least 45 degrees, preferably 55-65 degrees; the first ramp 116 being angled from the horizontal (a plane parallel to the land 122) of at least 2 degrees, preferably 3-7 degrees; and the ramp 124 being angled relative to the plane parallel to the land 122 of at least 15 degrees, preferably 22-27 degrees.

FIG. 3 depicts the gasket extension 106 as being secured to an exterior portion 130 of the coiled construction 24. In particular, the attachment surface 112 is secured, by way of adhesive or other suitable securing arrangement, to the exterior portion 130.

As mentioned above, the filter element 10 may include an optional center piece construction. The particular embodiment of the filter element 10 that is illustrated includes the center piece construction 20. The center piece construction 20 provides a mounting structure for holding and having the filter media 14 mounted thereon. The center piece construction 20, in preferred embodiments, also provides structure that is constructed and arranged to connect or be secured to other portions in a fluid cleaning system. For example, the center piece construction 20 may be constructed to permit framework from the filter housing 2 to be secured thereto. It may also provide structure to permit other structural support members from the filter element 10, the housing 2, or other portions of the filtration system. Alternatively, the center piece construction 20 may merely function to hold the filter media 14 and be devoid of any other connections. In situations where the center piece construction 20 is devoid of connections, either at one or both ends, the center piece construction 20 may be blocked with a suitable plug at one or both ends.

In the particular embodiment illustrated, the center piece construction 20 is constructed and arranged to be releasably, selectively secured or attached to the frame construction 28. In this particular embodiment, the center piece construction 20 is also depicted as being secured to an optional handle 22.

FIG. 6 shows the center piece construction 20 in schematic, cross-sectional view. In this particular embodiment, the center piece construction 20 comprises a central core 51 to the filter element 10. The core 51 is embodied as tube 52, preferably, a hollow cylinder 54. The cylinder 54 includes the first and second opposite ends 56, 57. The first end 56 is configured for selective attachment to the frame construction 28, usually located at the outlet face 12. The second end 57 is configured for optional attachment to the handle 22, and is usually located at the inlet face 11. A wall 58 is shown at approximately the center of the cylinder 54 to close the interior 59. The wall 58 provides structural support to the cylinder 54 at this section.

As mentioned above, the first end 56 of the cylinder 54, in the one depicted, is constructed and arranged to connect to the frame construction 28. Preferably, the first end 56 of the cylinder 54 includes a hook arrangement 76. The hook arrangement 76 includes at least one flange, preferably, a pair of deflectable flanges 62, 63 having hooks 66, 67 that engage the central hub 47 of the frame construction 28. In particular, the cylinder 54 has a pair of cut out extensions 69, 70 that allow the flanges 62, 63 to deflect toward each other (radially inwardly). Typically, the deflection will occur by camming force exerted by the hub 47 against the hooks 66, 67. See FIG. 8. As the frame construction 28 and the cylinder 54 are moved axially toward each other and the flanges 62, 63 are deflecting inwardly, eventually the hub 47 will reach the reliefs 72, 73 on the hooks 66, 67. When this happens, the flanges 62, 63 will deflect back to their natural position, and the cylinder 54 will be secured to the frame construction 28 because the hub 47 will be trapped below the hooks 66, 67. A rib 74, radially extending from the cylinder wall 75 and adjacent to the flanges 62, 63, prevents the frame 28 from sliding axially along the cylinder 75 toward the second end 57. It should be understood that the hook arrangement 76 could be on the framework 28 and engage the cylinder 54.

In reference now to FIG. 9, the second end 57 is shown optionally secured to the handle 22. In this particular embodiment, the handle 22 is in the form of a grip or knob 76. The knob 76 is arranged such that when mounted on the filter element 10, it includes a grasping structure 78 that is spaced a sufficient distance away from the inlet face 11 to permit at least a portion of a user's hand or fingers to be between the grasping structure 78 and the inlet face 11. In one example, the grasping structure 78 is spaced at least 0.5 inch from the inlet face 11. The particular knob 76 depicted includes a shaft 80 adjacent to the grasping structure 78. The shaft 80 is constructed and arranged to allow convenient engagement with the cylinder 54. In particular, the shaft 80 includes a pair of deflecting flanges 82, 83 having hooks 85, 86. Adjacent to each of the flanges 82, 83 are cut out extensions (not shown) that permit the flanges 82, 83 to deflect radially inwardly and toward each other.

The preferred cylinder 54, at the second end 57, defines at lease one, and preferably, a pair of apertures or voids 90, 91. The voids 90, 91 receive the deflecting flanges 82, 83 and engage the hooks 85, 86 to provide for a snap-fit engagement between the knob 76 and the cylinder 54. Again, it should be understood that parts can be reversed—that is, the second end 57 could have the barbs or deflecting flanges and engage apertures on the handle 22.

Note that in the cylinder 54 depicted, the voids 90, 91 are radially offset by 90 degrees relative to the cut out extensions 69, 70 of the first end 56. The voids 90, 91 are generally in line with the flanges 62, 63. This is arranged in this manner for molding techniques.

In general, to assemble the filter element 10, the filter media 14 is coiled or wound around the core 51. After the filter media 14 is in place around the core 51, the frame construction 28 holding the radial seal member 26 is mounted onto the filter media 14. This is done by snap engagement between the deflecting flanges 62, 63 and the hub 47. The band 32 is also secured to the outer periphery 113 of the coiled construction 24. Next, the knob 76 is snapped into the second end 57 of the core 51, by engagement between the flanges 82, 83 and the voids 90, 91. Of course, it should be realized that the knob 76 may be secured to the coiled construction 54 before the frame construction 28 is secured to the coiled construction 54.

The filter element 10 is then operably installed within the housing 2. The cover 4 will be removed from the body member 3 to provide access to the interior of the body member 3. The filter element 10 is inserted into the body member 3, with the outlet face 12 leading the insertion direction. The filter element 10 is pushed axially into the body member 3 to provide contact between the first seal member 16 and the housing 2 to create the radial seal 27.

Next, the cover 4 is oriented over the inlet face 11 of the filter element 10 that is protruding from the body member 3. The cover 4 is operably oriented to rest against the end of the body member 3, and the clamp assembly 104 is actuated. The clamp assembly 104 provides for an axial compression between the cover 4 and the body member 3. The second seal member 18 is also at this body member 3/cover 4 interface. The clamp assembly 104 is continued to be actuated to provide the axial force, until the axial seal 101 is formed between the cover 4, the second seal member 18 of the filter element 10, and the body member 3.

In operation, gas to be cleaned enters the air cleaner 1 through the slots 8 in the inlet grid 7. This partially filters the gas, by removing large debris. The gas then proceeds to the inlet face 11, through the filter media 14, and exits through the outlet face 12. After exiting the outlet face 12, the air may pass through an optional safety element 5 or secondary element, before exiting the housing 3 through the outlet tube 6.

After a period of operation, the media 14 will become loaded with dust and require servicing. To service the air cleaner 1, the cover 4 is removed from the body member by loosening the clamp assembly 104. This releases the axial seal 101. The cover 4 is removed from the body member, and the filter element 10 is removed from the body member 3 by pulling the filter element 10 from the body member 3. This releases the radial seal 27. The filter element 10 may then be disposed of, for example, by incineration. The filter element 10 preferably is constructed of at least 95%, more preferably 100% metal-free materials. The air cleaner 1 may then be supplied with a second, new, unused filter element.

The above specification, examples and data provide a complete description of the manufacture and use of the invention. Many embodiments of the invention can be made.

What is claimed is:

1. An air filter arrangement comprising:
    (a) a straight through flow media construction comprising a fluted media sheet secured to a second media sheet and having a coiled construction; the media construction having a plurality of flutes, an inlet face, an opposite outlet face, and an outer surface;
        (i) said plurality of flutes comprising inlet flutes and outlet flutes;
            (A) said inlet flutes being open adjacent to said inlet face and closed adjacent to said outlet face; and said outlet flutes being closed adjacent to said inlet face and open adjacent to said outlet face; and,
            (B) the media construction being closed to passage of unfiltered air therethrough without filtering passage through the media; and,
    (b) a seal member secured to said outer surface of said coiled media construction;
        (i) said seal member including a gasket extension having: first and second opposite ends; an attachment portion; and, a protrusion extending from the attachment portion;
            (A) said attachment portion including an attachment surface securing said gasket extension to said outer surface of said coiled construction;
            (B) said protrusion extending from the attachment portion to permit portions of a housing to squeeze the protrusion and form an axial seal;
                (1) said protrusion including first and second portions with a land therebetween; the land being generally parallel to the attachment surface; and
            (C) said gasket extension including first and second sections; said first section extending from said first end of the gasket extension to said first portion of the protrusion; said second section extending from said second portion of the protrusion to said second end of the gasket extension.

2. An air filter arrangement according to claim 1 further comprising:
    (a) a handle positioned to project outwardly from the inlet face.

3. An air filter arrangement according to claim 1 further comprising:
    (a) a core construction within said media construction.

4. An air filter arrangement according to claim 1 wherein:
    (a) said attachment surface is secured to said outer surface of said coiled construction with adhesive.

5. An air filter arrangement according to claim 1 wherein:
    (a) the coiled media construction is round.

6. An air filter arrangement according to claim 1 further including:
    (a) a radial seal member secured to the coiled construction.

7. An air filter arrangement according to claim 6 wherein:
    (a) the radial seal member is positioned adjacent the outlet face of the media construction.

8. An air filter arrangement comprising:
    (a) a straight through flow media construction comprising a fluted media sheet secured to a second media sheet and having a coiled construction; the media construction having a plurality of flutes, an inlet face, an opposite outlet face, and an outer surface;
        (i) said plurality of flutes comprising inlet flutes and outlet flutes;
            (A) said inlet flutes being open adjacent to said inlet face and closed adjacent to said outlet face; and said outlet flutes being closed adjacent to said inlet face and open adjacent to said outlet face; and,
            (B) the media construction being closed to passage of unfiltered air therethrough without filtering passage through the media; and,
    (b) a first seal member positioned adjacent the media construction outlet face;

(i) the first seal member comprising a radial seal member support on a frame construction secured to the media construction; and, (c) a second seal member secured to said outer surface of said coiled media construction at a location spaced from the first seal member;

(i) said second seal member including a gasket extension having a protrusion;

(A) said protrusion extending from the media construction to permit portions of a housing to squeeze the protrusion and form an axial seal.

9. An air cleaner comprising:

(a) a housing having a body member and a removable cover, an inlet, and an outlet; and (b) a straight through flow filter element operably mounted within the housing; the filter element having media and defining an inlet face, and an opposite outlet face, such that gas to be cleaned passes through the housing inlet, through the element inlet face, through the media, through the element outlet face, and out through the housing outlet;

(i) the media comprising a fluted media sheet secured to a second media sheet and having a coiled construction with a plurality of flutes and an outer surface;

(ii) said plurality of flutes comprising inlet flutes and outlet flutes;

(A) said inlet flutes being open at the inlet face and closed at the outlet face; and said outlet flutes being closed at the inlet face and open at the outlet face; and, (B) the media construction being closed to passage of unfiltered air therethrough without filtering passage through the media; and, (iii) a seal member secured to said outer surface of said coiled media construction;

(A) said seal member including a gasket extension having: first and second opposite ends; an attachment portion; and a protrusion extending from the attachment portion;

(B) said attachment portion including an attachment surface securing said gasket extension to said outer surface of said coiled construction;

(C) said protrusion extending from the attachment portion to permit portions of the housing to squeeze the protrusion and form an axial seal between the filter element and the housing;

(1) said protrusion including first and second portions with a land therebetween; the land being generally parallel to the attachment surface; and (D) said gasket extension including first and second sections; said first section extending from said first end of the gasket extension to said first portion of the protrusion; said second section extending from said second portion of the protrusion to said second end of the gasket extension.

10. An air cleaner according to claim 9 further including:
(a) a safety element operably oriented in the housing downstream of the filter element.

11. An air cleaner according to claim 9 wherein:
(a) the axial seal is formed by squeezing the protrusion between the housing cover and housing body member.

12. An air cleaner according to claim 11 wherein:
(a) said protrusion has a cross-sectional shape of a trapezoid.

13. An air cleaner according to claim 9 further including:
(a) a radial seal formed between the filter element and the housing.

14. An air cleaner according to claim 9 wherein:
(a) the filter element is round.

15. An air cleaner according to claim 9 wherein:
(a) a handle is positioned to project outwardly from the inlet face of the media.

* * * * *